No. 669,391. Patented Mar. 5, 1901.
J. HILLENBRAND.
BRANCH CONDUIT FOR TRANSMITTING PRESSURE OF MAIN CONDUITS TO REGISTERS.
(Application filed Jan. 8, 1901.)
(No Model.)
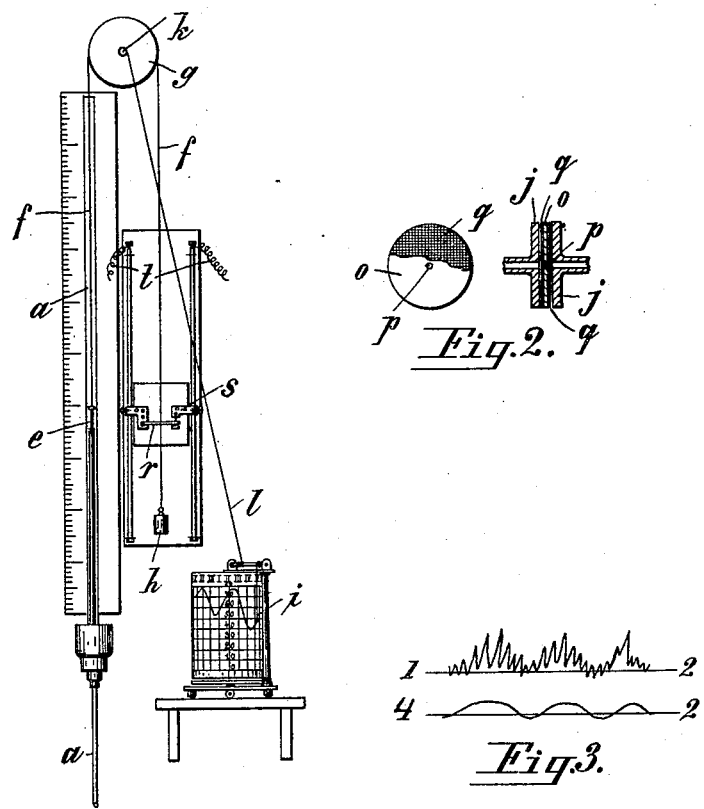
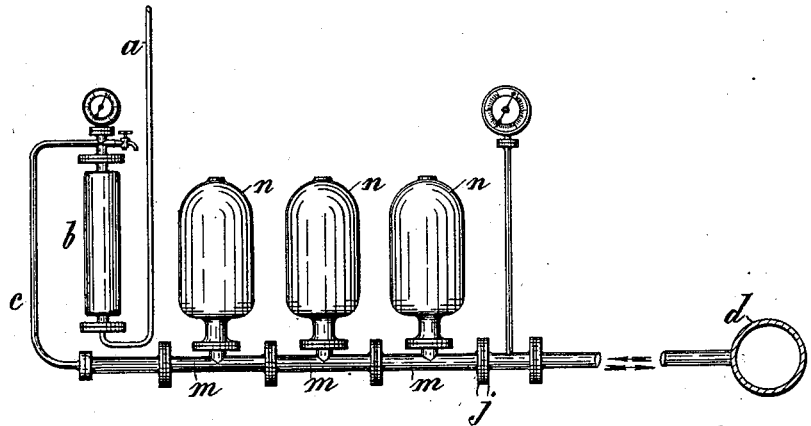

UNITED STATES PATENT OFFICE.

JULIUS HILLENBRAND, OF MANNHEIM, GERMANY, ASSIGNOR TO THE LUXSCHE INDUSTRIEWERKE ACTIEN-GESELLSCHAFT, OF LUDWIGSHAFEN, GERMANY.

BRANCH CONDUIT FOR TRANSMITTING PRESSURE OF MAIN CONDUITS TO REGISTERS.

SPECIFICATION forming part of Letters Patent No. 669,391, dated March 5, 1901.

Application filed January 8, 1901. Serial No. 42,565. (No model.)

*To all whom it may concern:*

Be it known that I, JULIUS HILLENBRAND, a subject of the King of Bavaria, residing at Mannheim, in the Grand Duchy of Baden, German Empire, have invented certain new and useful Improvements in Branch Conduits for Transmitting the Water-Pressure of a Main Conduit to a Registering Instrument, of which the following is a specification.

My invention relates to improvements in branch conduits for transmitting the water-pressure of a main conduit to an instrument for automatically registering or recording the variations of pressure existing in the main and for automatically signaling to or calling on the waterworks in case that said pressure does fall below the normal or standard height.

Heretofore branch conduits for transmitting the water-pressure of the main to an instrument for registering said pressure generally consist of a pipe or of pipes of common type, so that all the variations of pressure in the main, even those of comparatively shortest duration, are transmitted or reported to the registering instrument. Hence it follows that the latter is compelled to correspondingly register or record on the recording sheet or table those short variations and to also signal to the waterworks each case of short or temporary subnormal pressure. This obviously is very inconvenient, for the reason that in consequence of the continuous wear and tear arising from the uninterrupted working of the movable active parts of the instrument the latter soon becomes deficient as to its reliability of registering and, moreover, that each signaling sent to the waterworks induces the works to unnecessarily give the pumps a greater speed, notwithstanding the fact that the said temporary variations of pressure in the main do not at all require any special assistance on the part of the pumps.

The present invention has the object to obviate said inconveniences by inserting in the branch conduit a certain resistance, so that the water passing from the main toward the registering instrument or returning from the latter to the main in accordance with the variations of pressure will be prevented from rushing through the branch conduit, but will rather pass slowly from or toward the registering instrument. In case of any variation of pressure occurring in the main conduit said variation, therefore, will not instantaneously be transmitted to the instrument and in case of short duration thereof will not at all be transmitted to the latter. When, however, the variation of pressure continues to exist for a longer period, then the registering and signaling instrument will duly be actuated in conformity with the rise or fall of the pressure in the main conduit. Accordingly the recording-pin of the registering instrument draws a more even line on the recording sheet or table, and in case of using a bell at the waterworks electrically connected with the registering instrument for the purpose of sounding an alarm at the time the pressure in the main conduit falls below the standard such alarm will not be given unless the pressure in the main conduit remains below the standard for a comparatively longer period determined by the resistance inserted in the branch conduit. I attain this object by the device illustrated in the accompanying drawings, in which—

Figure 1 is an elevation of the registering and signaling instrument and (see lower part of the figure) of the branch conduit provided with the device embodying the invention. Fig. 2 shows certain detail views. Fig. 3 shows, by way of example, a recording table or sheet with a record-line 1 2, as heretofore, marked thereon by the registering-pin and a second table with a corresponding line 4 2 marked thereon by the pin in accordance with the present invention.

The registering and signaling instrument shown in the upper part of Fig. 1 is of well-known construction, and consists of a scale-tube $a$, connected to the branch conduit by the aid of the interposed vessel or chamber $b$ and an intermediate pipe $c$. The scale-tube is open at its upper end, so that the mercury contained in the vessel $b$ can freely rise in the scale-tube $a$ under the action of the water passing from the main conduit $d$ through the branch conduit into the intermediate pipe c and pressing upon the surface of the mercury contained in the vessel. In accordance with the variations of pressure exerted upon the mercury in conformity with the pressure existing in the main conduit the surface of the mercury in the scale-tube $a$ rises or falls, and the index-rod $e$, within the scale-tube, correspondingly rises or falls and transmits its movements by means of the cocoon-thread $f$, running over the pulley $g$, under the action of the weight $h$ at the outer end of the thread, to the recording-pin $i$, suitably connected to the axle $k$ of the pulley $g$ by the aid of a thread $l$ and suitable intermediate means.

All the instrumentality described so far has been well known heretofore.

The present invention consists in providing a certain resistance in the branch conduit for the purpose above indicated. To this end a single flanged pipe $m$, having an air vessel $n$ thereon, or several such pipes, are inserted in the branch conduit, (see Fig. 1, lower part,) each air-chamber freely communicating with its carrier or pipe $m$. A metallic disk $o$, provided with a fine central bore $p$ and covered on either side by a sheet of wire-gauze $q$, is embedded between the adjacent flanges $j$ of the pipes, so that the water will gently flow from one pipe to the adjacent one, and therefore the variations of pressure in the main $d$ will slowly be transmitted to the vessel $b$ and the registering instrument, thus avoiding all the momentaneous variations of pressure to be recorded or signaled. This object is attained by the use of the air vessels in combination with the perforated disks $o$, the wire-gauze serving the purpose of preventing mineral or organic impurities of the water from choking or obstructing the passage $p$.

As illustrated by the recording-line 1 2 in Fig. 3, all the momentaneous variations of pressure having a push-like character have been recorded heretofore in the registering instrument, and frequently, but unnecessarily, the index $e$ descended below the standard, (indicated in the diagrams of Fig. 3 by the line 1 2,) causing the weight $h$, Fig. 1, to lift the lever $r$, so as to come in contact with the contact-piece $s$ and to send an electric current from any suitably-arranged electric source through the circuit $t$ (only partly shown in Fig. 1) to the alarm-bell located at the waterworks. In the case of the present invention, however, the recording-line has a more even appearance, (see line 4 2, Fig. 3,) and the bell at the waterworks is not operated to ring except in case of need—that is to say, as soon as the subnormal pressure in the main conduit continues to exist for a longer period—and hence is of practical importance.

What I claim as my invention, and desire to secure by Letters Patent, is—

1. The combination, in a water-conduit, of an instrument for registering or signaling the variations of pressure in said conduit, with a branch conduit comprising a flanged pipe with an air vessel thereon or several such pipes and a metallic disk between the flanges of two adjacent pipes, said disk having a fine central bore, all substantially as set forth.

2. In a water-conduit, the combination of an instrument for registering or signaling the variations of pressure in said conduit with a branch conduit comprising a flanged pipe or several such pipes with air vessels thereon, a metallic disk between the flanges of two adjacent pipes, said disk having a fine central bore and wire-gauze sheets inserted between the flanges and the disk, substantially as shown and for the purpose specified.

In testimony whereof I have signed my name to this specification in the presence of the subscribing witnesses.

JULIUS HILLENBRAND.

Witnesses:
  H. W. HARRIS,
  JACOB ADRIAN,
  FRIEDRICH FREY.